United States Patent [19]

Walden

[11] 4,102,426
[45] Jul. 25, 1978

[54] VEHICULAR SAFETY DEVICE

[76] Inventor: Michael Dennis Walden, 709 Sammon Ave., Toronto, Ontario, Canada, M4C 2E3

[21] Appl. No.: 692,724

[22] Filed: Jun. 4, 1976

[51] Int. Cl.² ................................. G08G 1/00
[52] U.S. Cl. ......................... 180/98; 340/22; 340/52 R
[58] Field of Search ............... 180/98, 103 R; 340/237 R, 1 R, 52 R, 53, 31, 32 R, 22, 235; 343/5 W

[56] References Cited

U.S. PATENT DOCUMENTS

| Re. 23,896 | 11/1954 | Higgins | 340/53 |
|---|---|---|---|
| 2,216,575 | 10/1940 | Seinfeld | 180/98 |
| 2,690,555 | 9/1954 | Bradley | 180/98 |
| 2,804,160 | 8/1957 | Rashid | 180/98 |
| 3,011,580 | 12/1961 | Reid | 180/98 |
| 3,102,257 | 8/1963 | Miller | 340/237 R |
| 3,210,726 | 10/1965 | Copsy | 180/98 X |
| 3,689,882 | 9/1972 | Dessailly | 180/98 X |
| 3,896,382 | 7/1975 | Magenheim | 343/5 W X |

*Primary Examiner*—Joseph F. Peters, Jr.
*Assistant Examiner*—R. Schrecengost
*Attorney, Agent, or Firm*—Robert D. Farkas

[57] ABSTRACT

This disclosure pertains to a vehicular safety device utilizing a fog sensing apparatus for detecting the presence of fog immediately preceding the foremost portions of the vehicle. When fog is detected, the braking system of the vehicle is gradually but forceably brought into play reducing the speed of the vehicle to a preset maximum determined by a governor operated by the engine. A control unit is concurrently activated which causes the rearmost lamps of the vehicle to intermittently energize and automatically altering the mode of operation of the headlamps of the vehicle for a time period equal to the continual sensing of fog.

1 Claim, 2 Drawing Figures

U.S. Patent     July 25, 1978     4,102,426
FIG.1
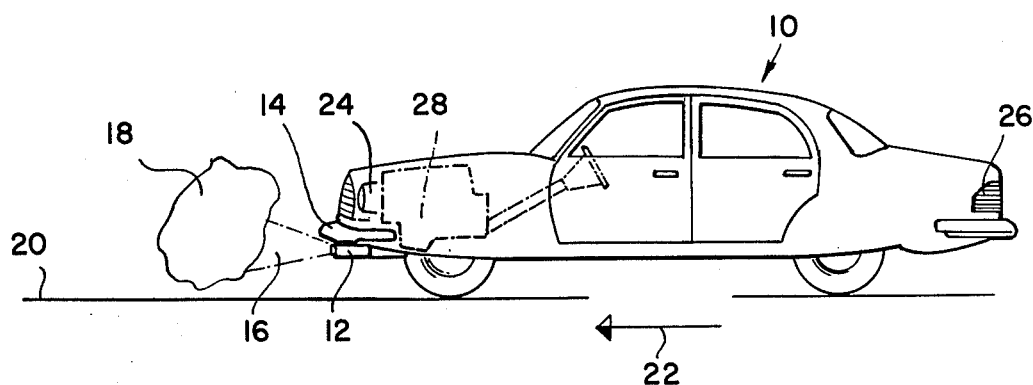
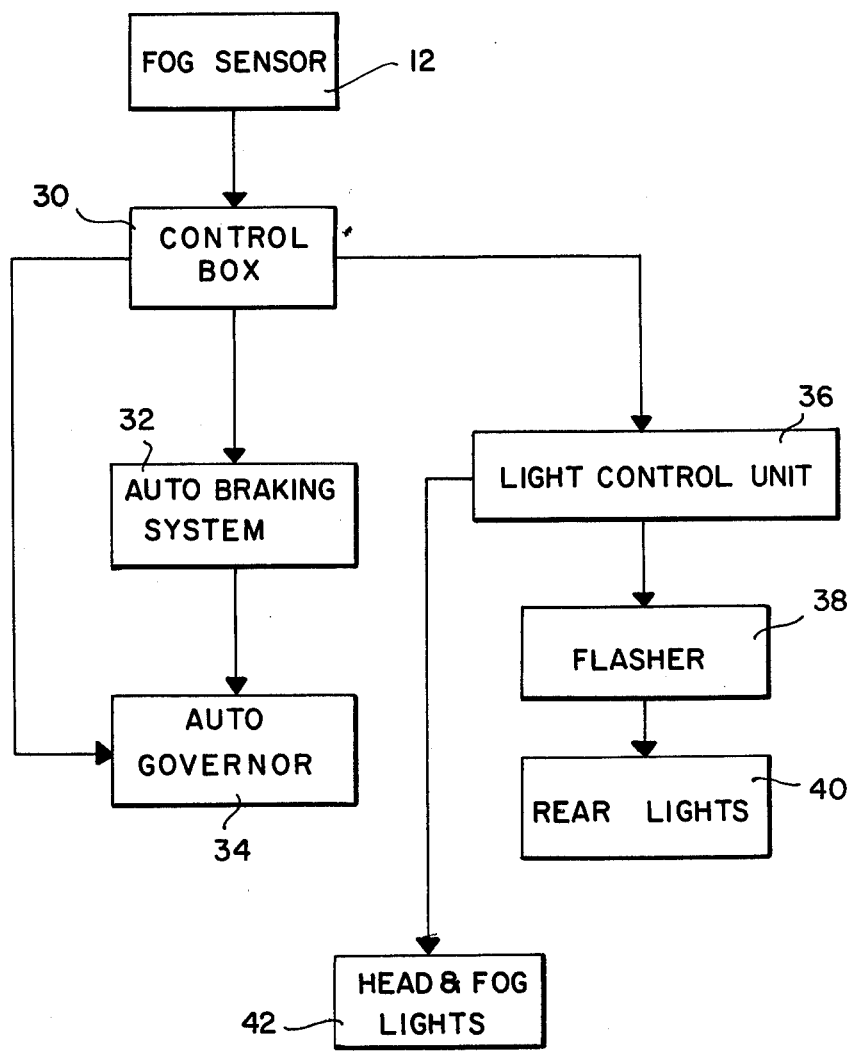
FIG.2

4,102,426

VEHICULAR SAFETY DEVICE

BACKGROUND OF THE INVENTION

1. THE FIELD OF THE INVENTION

This invention relates to vehicular safety devices and more particularly to that class controlling the speed and lighting systems of a motor vehicle dependent upon the presence of fog.

2. DESCRIPTION OF THE PRIOR ART

The prior art abounds with safety devices which automatically control the operational characteristics of the vehicle as a function of the proximity to a leading vehicle. U.S. Pat. No. 2,851,120 issued on Sept. 9, 1958 to M. Fogiel and U.S. Pat. No. 3,011,580 issued on Dec. 5, 1961 to J. D. Reid and U.S. Pat. No. 3,716,822 issued on Feb. 13, 1973 to Y. Tsuruta all teach control of the speed of a motor vehicle responsive to the proximity and location of solid objects or leading vehicles located forward of the vehicle so protected.

SUMMARY OF THE INVENTION

A primary object of the instant invention is to provide a vehicular control responsive to the presence of fog immediately preceding the forwardmost portion of the vehicle.

Another object of the instant invention is to provide braking means automatically slowing down the vehicle upon the detection of fog.

Still another object of the instant invention is to provide signalling means visibly signalling the detection of fog to trailing vehicles.

Yet another object of the instant invention is to provide headlamps control upon the detection of fog immediately preceding the vehicle.

A further object of the instant is to provide governor control limiting the speed of the vehicle when fog bound.

A fog sensor is installed at or near the front bumper of the vehicle responsive to fog patches above the road bed immediately preceding the vicinity of the front portions of the vehicle. The fog sensor, when detecting the presence of fog, activates a control box which in turn automatically applies the vehicle's braking system to that the speed of the vehicle is reduced and limited to a speed determined by a preset governor attached to the engine. The control box simultaneously activates a high intensity rearmost signalling lamp system intermittently, for the period of time that fog is detected. Concurrently, and for the same duration, the headlamps of the vehicle are modified in mode of operation by either turning on fog lamps or changing from high to low beam. All vehicular controls, including the application of the emergency braking system and speed limiting devices, are turned off when fog is no longer detected.

These objects, as well as other objects of the present invention, will become more readily apparent after reading the following description of the accompanying drawings.

BRIEF DESCRIPTION OF THE DRAWINGS

FIG. 1 is a side elevation view of a vehicle equipped with the present invention.

FIG. 2 is a block diagram representation of the operable components of the present invention.

DESCRIPTION OF THE PREFERRED EMBODIMENT

The structure and method of fabrication of the present invention is applicable to a fog detector preferably utilizing a small forwardly directed light source, projecting a light towards fog located slightly above the roadbed immediately preceding the forward portion of the vehicle so equipped. A photoelectric cell is directed in such a manner as to be responsive to light signals reflected from the fog but unresponsive from incident lighting such as is available from oncoming vehicles. Polarized light may be utilized as well as conventional sound producing and detecting apparatus sensitive to the sound absorbing characteristics of the fog. The sensor feeds a control box comprising, if desired, a relay which in turn, operates an automatic braking system and a light control unit when energized due to the presence of detected fog by the fog sensor.

The automatic braking system utilizes a conventional vehicular braking apparatus operated by a spring loaded solenoid released cylinder attached to the braking hydraulic lines of the vehicle. A hydro-check unit or needle valve may be interposed between the pressurized side of the cylinder to control the rate of application of hydraulic forces to the master cylinder operating the braking system of the vehicle. An adjustable but preset governor is permitted to control the speed of rotation of the engine, by conventional means, when operated, so as to limit the speed of the vehicle to a preset maximum.

The control relay, when energized, causes high intensity rearmost lamps to energize utilizing a flasher to produce intermittent illumination therefrom. A set of contacts, operated by the control relay, when energized, may be utilized to either transfer the headlamp lighting mode from high beam to low beam or, if desired, totally extinguish the conventional high-low headlamps whilst energizing a set of fog lamps. When fog is no longer detected, the automatic braking system is released, the control of the governor over the engine speed is nullified, the intermittently operating fog signalling lamps are extinguished, and the headlamp or fog lamps are returned to the initial operating condition.

Now referring to the Figures, and more particularly to the embodiment illustrated in FIG. 1 showing vehicle 10 having a fog sensor 12 installed immediately below the front bumper 14. Rays 16 are utilized to detect the presence of fog 18 over road-bed 20 upon which vehicle 10 is traveling in the direction of arrow 22. Headlamps 24, rearlamps 26, a braking system, not shown, and engine 28, shown in dotted lines, are all modified in operation when fog sensor 12 detects fog 18.

FIG. 2 illustrates the fog sensor 12 providing a signal to the control box 30 when fog is sensed thereby. When the control box 30 is activated, a signal is sent to the automatic braking system 32, the automatic governor 34, and the light control unit are simultaneously placed into operation. The light control unit operates flasher 38 causing rear lights 40 to intermittently energize and, simultaneously, provides a signal to the head light or fog light devices of the vehicle, causing them to operate in a mode most suitable for traveling in fog bound areas. When the fog sensor ceases to detect the presence of fog, the control box 30 is made inoperative causing the automatic braking system 32, the automatic governor 34, and the light control unit 36 to become inoperable, extinguishing thereby, rearlights 40 and restoring the head and fog lights to a normal mode of operation and allowing the vehicle operator full manual control over the engine speed and the vehicular braking system.

One of the advantages of the instant invention is a vehicular control responsive to the presence of fog immediately preceding the forwardmost portion of the vehicle.

Another advantage of the instant invention is a vehicular safety device with braking means automatically slowing down the vehicle upon the detection of fog.

Still another advantage of the instant invention is a vehicular safety device with signalling means visibly signalling the detection of fog to trailing vehicles.

Yet another advantage of the instant invention is a vehicular safety device with headlamps control upon the detection of fog immediately preceding the vehicle.

A further advantage of the instant invention is a vehicular safety device with governor control limiting the speed of the vehicle when fog bound.

Thus there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A vehicular safety device comprising fog detecting means for the detection of fog in the pathway of a vehicle, said fog detecting means carried by a frontmost portion of said vehicle, said fog detecting means utilizing rays emanating outwardly and forwardly from said vehicle directed over a roadway carrying said vehicle, said fog detecting means including means to detect said rays reflected from said fog when said fog is located in front of said vehicle and above said roadway, said fog detecting means for controlling apparatus means of said vehicle in a fog detected mode and a lack of fog detected mode, said fog detecting means being disposed in said fog detected mode when said rays are reflected from said fog towards said frontmost portion of said vehicle, said apparatus means including automatic braking means and automatic speed control means and visual signalling means and frontmost lamp control means, said automatic braking means utilized for the application of braking forces to said vehicle when said fog detecting means is in said fog detected mode, said applied braking forces being removed when said detecting means is in said non fog detected mode, said automatic braking means including means for automatically adjusting the amplitude of said braking forces in proportion to the speed of travel of said vehicle, said automatic speed control means limiting the speed of the motor of said vehicle when said fog detecting means is in said fog detected mode, said automatic speed control means being inoperable when said fog detecting means is in said non fog detected mode, said visual signalling means visibly signalling trailing vehicles located behind said vehicle by intermittently operating at least one lamp secured to a rear surface of said vehicle when said fog detecting means is in said fog detected mode, said visual signalling means becoming inoperable when said fog detecting means is in said non fog detected mode, said frontmost lamp controlling means for altering the lighting mode emanating forward of said vehicle from a lamp located on a front surface of said vehicle into a fog lighting mode when said fog detecting means is in said fog detected mode, said frontmost lamp control means for altering said lighting mode to a non fog lighting mode when said fog detecting means is in said non fog detected mode.

* * * * *